Aug. 21, 1962  H. A. RALSTON ETAL  3,049,856
AGRICULTURAL IMPLEMENTS
Filed Nov. 18, 1959  2 Sheets-Sheet 1

INVENTOR.
HAROLD A. RALSTON
PHILIP D. WENZEL
BY
*Emerson B Donnell*
ATTORNEY

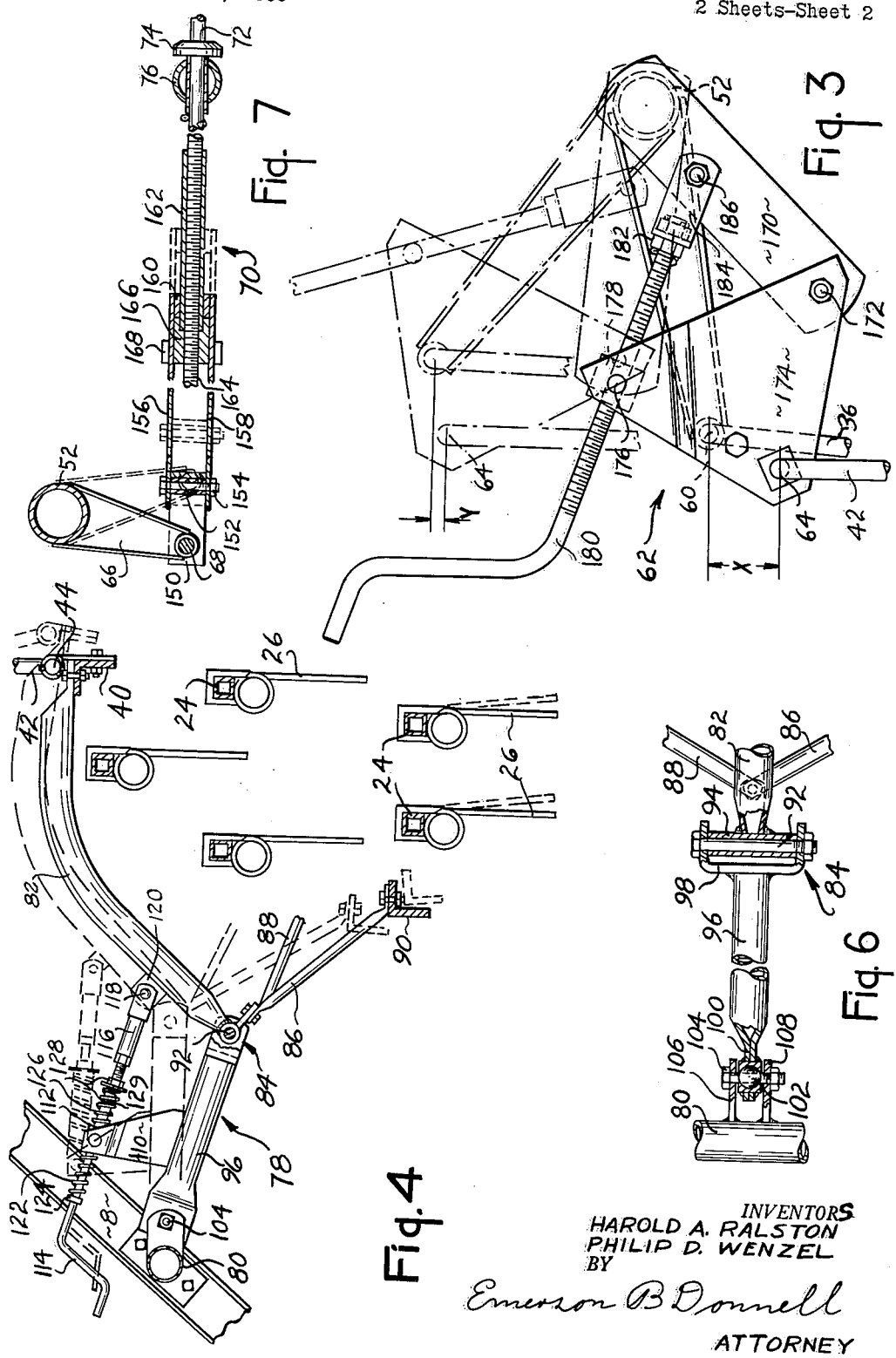

3,049,856
AGRICULTURAL IMPLEMENTS
Harold A. Ralston, Rockford, Ill., and Philip D. Wenzel, Stockton, Calif., assignors to J. I. Case Company, a corporation of Wisconsin
Filed Nov. 18, 1959, Ser. No. 853,961
15 Claims. (Cl. 56—377)

The present invention relates to side delivery rakes, and particularly to the type known as acute angle rakes; and an object of the invention is to generally improve the construction and operation of implements of this type.

Such a rake generally comprises an arched frame which is propelled along the ground and beneath the arched portion of which is suspended a raking reel which is carried along by the frame and which acts upon crop material over which the rake passes, and a further object is to improve the means for suspending and controlling the raking reel and its relations to the arched frame.

A further object is to provide power-actuated mechanism for raising the reel off the ground for transportation and other mechanism for determining an adjusted lowered position, the latter being also operable in the absence of such power-actuated mechanism to raise the reel into a transport position.

Further objects are to provide for raising or lowering one end of the reel to level it or to enable it to operate properly if the frame is tilted for any reason; to avoid digging of one end of the reel into the ground if the other end is raised by encountering an obstruction; to provide mechanism which serves to position the reel against displacement by the backward reaction of the crop being raked, while permitting the reel to yield backwardly and upwardly upon encountering an obstruction, which mechanism also operates to adjust the angle of the rake teeth in relation to the ground.

A further object is to provide, in such a mechanism, an arrangement whereby the reel will always be raised to a substantially level or horizontal transport position, whether or not it is level or horizontal in its down or working position.

Further objects and advantages will become apparent from the following specification and accompanying drawings in which:

FIG. 3 is an enlarged elevation of an adjusting mechanism shown in FIG. 2.

FIG. 4 is an enlarged sectional view of the raking reel and associated parts, taken substantially along the longitudinal vertical median plane of the device shown in FIG. 1.

FIG. 6 is a fragmentary plan view of certain mechanism indicated in FIG. 4.

FIG. 7 is a fragmentary side elevation of certain mechanism indicated in FIG. 1.

Figure 5:
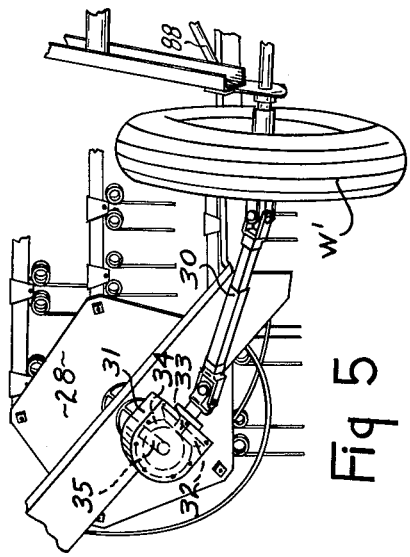
FIG. 5 is a perspective view of the rake from the left rear, showing a drive mechanism.

Similar reference characters have been applied to the same parts wherever they appear throughout the specification and drawings in which an illustrative embodiment of the invention is shown; but it is to be understood that the invention is not to be considered as limited to what is shown and described, or in fact in any manner, except as defined in the claims.

Figure 1:
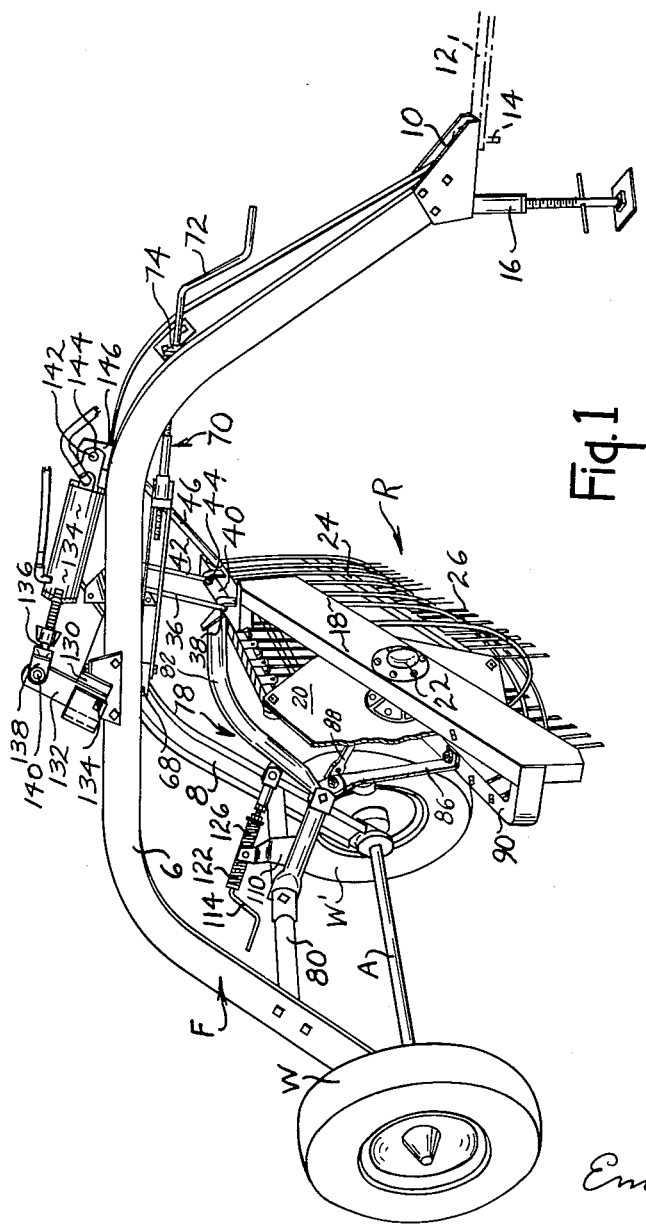
FIG. 1 is a side elevation of a rake embodying the invention.

Referring to FIG. 1, the implement comprises a longitudinally directed arched V-shaped main frame supported at the rear on ground-engaging wheels W and W' carried on an axle A. Frame F comprises, in the present instance, a channel member 6 and a channel member 8 extending respectively from adjacent wheel W and adjacent wheel W' upwardly, forwardly and then downwardly in generally converging relation and being connected together at their front ends by an upwardly open channel section 10, which in operation rests upon a tractor drawbar 12 from which the front end of the rake is supported and propelled. A hitch pin 14 of any suitable type connects channel 10 with drawbar 12. When the rake is not in use, a jack generally designated as 16 supports member 10 in position for hitching to a tractor. Since these elements form no part of the invention, they will not be further described.

A raking reel generally designated as R is suspended beneath frame F and includes a frame designated as a whole by numeral 18, and in which is journaled a rotating disc 20, journaled on a bearing 22 and on which, in turn, are journaled a series of tooth bars as 24. Bars 24 carry raking teeth 26, and a second disc 28 FIG. 5 similar to disc 20, carries the opposite ends of tooth bars 24 and is rotated by a universal joint shaft generally designated as 30 extending from wheel W' to a gear housing 31 of well-known type in which is enclosed a gear 32 fixed on a shaft 33 driven by joint shaft 30, and driving a gear 34, fixed on a shaft 35 on which is fixed above-mentioned plate 28. Thus plate 28 is rotated by reason of rotation of wheel W'. This mechanism need not be further described, since it forms no part of the invention.

Reel R, as a whole, is of generally well-known construction and since the details thereof are not part of the invention, it need not be further described except as necessary to point out the relations between it and the rest of the structure.

Reel R is suspended from frame F by means of a link 36 in the present instance in the form of a rod or rigid element and having a pivotal connection 38 to a frame element 40 constituting part of reel frame 18, and by a similar link 42 having a pivotal connection 44 to above-mentioned frame element 40, spaced from above-mentioned pivotal connection 38 along the length of frame element 40. A stabilizer bar 46 is pivoted at 48, FIG. 2, to frame element or channel 8 and at 50 to frame element 40. It will be apparent that, with the construction so far described, reel R will be supported or suspended beneath frame F and will be stabilized against reciprocation or swinging in the direction of its length—that is transversely of the direction of travel.

For supporting links 36 and 42 and thereby reel R, a rock shaft 52 is journaled in suitable bearings 54 and 56 mounted respectively on channels 6 and 8 and has means which will be described presently for rocking it and holding it in adjusted positions. An arm 58 rigid with rock shaft 52 projects in the present instance, forwardly from a point adjacent one end of the rock shaft and has a pivotal connection 60 with above-mentioned link 36. At the other end rock shaft 52 has an adjustable or shiftable arm structure, generally designated as 62. Arm 62 has a pivotal connection 64 through which it is connected with above-mentioned link 42. Rocking of rock shaft 52 will therefore cause raising and lowering of raking reel R. Rock shaft 52 has a downwardly or transversely extending arm 66 to which is attached, through a pivotal connection 68, an extensible adjusting device or telescoping link, generally designated as 70, terminating in an adjusting crank 72 engaging, through a thrust bearing 74, a cross member 76 extending between and fixed in relation to above-mentioned channels 6 and 8. Turning of crank 72, as will be further described, causes forward or rearward rocking of arm 66 and therefore of rock shaft 52 with corresponding raising or lowering of reel R.

In operation, reel R is subject to a strong rearward pressure reaction, and which must be counteracted or overcome to prevent the reel from swinging backwardly out of desired position. For this purpose control mechanism generally designated as 78 is provided and which refers the backward reaction to a cross member 80 fixed between above-mentioned channel members 6 and 8, generally rearwardly of reel R., as best seen in FIG. 4.

Control mechanism 78 comprises a rearwardly directed strut 82, fixed in the present instance with above-mentioned frame member 40 and extending backwardly therefrom above the path of tooth bars 24 and downwardly to a hinge construction 84. Suitable braces 86 and 88 extend from spaced points on a frame member 90 constituting part of reel frame 18, rearwardly of tooth bars 24, and in the present instance, substantially parallel to frame member 40, backwardly and inwardly and are connected with hinge construction 84. In this manner, strut 82 is very firmly braced so as to project rearwardly in substantially rigid relation to reel frame 18. Hinge construction 84 includes a transverse pin 92 of substantial length extending through a sleeve 94, FIG. 6, suitably fixed on strut 82, and a link generally designated as 96, has a clevis 98 engaged by the ends of pin 92 whereby link 96 is constrained to up-and-down swinging movement (pin 92 being nominally horizontal) but prevented from swinging from side to side by reason of the rather substantial construction of hinge portion 84. This is advantageous in the operation of the device, as will appear.

Link 96 terminates at its other end in a tongue portion 100 in which is journaled a ball 102 fixed in the present instance on a bolt or the like 104, engaged in ears 106 and 108 fixed on above-mentioned cross member 80. In this manner, oscillation of reel R in a horizontal plane is effectively prevented, since in such plane, link 96 is rigid with strut 82 and the complete system is anchored at a fixed point, namely, ball 102 on cross member 80. In other words, the control mechanism 78 is laterally rigid. As so far described, control mechanism 78 would fold upwardly in response to any backward pressure on teeth 24, and this action is resisted by the following construction.

Link 96 has an upwardly projecting arm or bracket 110, FIG. 4, preferably upwardly bifurcated, and having journaled thereon a trunnion block 112, through which is slidable an adjusting shaft or crank 114. Crank 114, in the present instance, is threaded into the sleeve portion of a clevis 116, pivoted on a pin 118, engaged in an ear 120 fixed on above-mentioned strut 82 in a position spaced generally above hinge pin 92. Crank 114 therefore, must slide through block 112 in the event of any swinging of link 96 and strut 82 relatively to each other, since any such movement would change the center distance between trunnion block 112 and hinge pin 92. A spring 122 is arranged about crank 114 between trunnion block 112 and an adjustable collar 124 fixed on crank 114, while a similar spring 126 is arranged between crank 114 and an adjustable collar 128, also fixed on crank 114. By this means, crank 114 is resisted in sliding through trunnion block 112, whereby swinging of strut 82 and link 96 relatively to each other is yieldably resisted. Spring 122 is of such a degree of stiffness as to resist hinging movement of strut 82 and link 96 upwardly under the normal backward reaction of the crop on the teeth 24, but in the event that the teeth encounter an obstruction, so that an excessive backward thrust is developed, spring 122 may compress while mechanism 78 may hinge to the region of the dot-and-dash position in FIG. 4, allowing reel R to rise and pass over the obstruction. The resiliency of spring 122 and the weight of the parts will promptly restore them to the full line position, as soon as the obstruction is passed.

In the event that reel R swings backwardly and upwardly as shown, crank 114 will slide through trunnion block 114 in the direction to compress spring 122, and as will be apparent, the pressure of spring 122 may be adjusted by shifting collar 124 along the crank so that there will be sufficient resistance to prevent such swinging under the normal backward pressure exerted by the crop being processed, while allowing such swinging in the event of encountering an obstruction. As stated, spring 122 (in addition to the weight of reel R) will return the reel to working position after the obstruction is passed, the normal working position being determined by the adjustment of nut or collar 128 which determines the degree of compression of spring 126. The movement is therefore arrested by a resilient element rather than by a positive limit stop and there is no serious shock load applied to the parts at this point in the operation.

A spacer 129 is slidable on crank 114 between collar 128 and trunnion block 112 and acts as a stop, defining a positive minimum distance between trunnion block 112 and collar 128, and also serving to protect crank 114 from contact with spring 126, which might tend to damage the threads and make difficult the adjustment of collar 128.

The compression or force exerted by both springs 122 and 126 is readily adjusted by shifting of collars 124 and 128 as described, trunnion block 112 normally taking up a position between collars 124 and 128 determined by the adjustment of the collars and the stiffness of the springs.

This position will be a substantially fixed position, owing to the stiffness of the springs aforesaid, and the spacing between trunnion block 112 and pin 118 may be changed at any time by rotating crank 114. As the crank screws into clevis 116, the distance will be shortened, and the angle between strut 82 and link 96 will be reduced. Such shifting will cause a counterclockwise rotation of reel R as a whole, causing a downward and forward inclination of the same including teeth 24 as illustrated in the dotted lines. This is often desirable in order to change the action of the teeth to suit the condition of the crop being harvested. Opposite rotation of crank 114 will cause the opposite result or downward and rearward inclination of teeth 24. This reel control mechanism 78 accordingly serves not only to prevent oscillation of the reel in a horizontal plane, undesirable backward swinging of the reel, and to provide intentional backward swinging to clear obstructions, but also to adjust the angle of the rake teeth in relation to the ground.

Returning to the lifting mechanism, rock shaft 52 has a plate 130 fixed on the end adjacent above-mentioned arm 66, and which is folded back on itself to form a slotted receiver for a plate 132 pivoted on a pin, bolt or the like 134 so that plate 132 may swing freely clockwise (assuming rock shaft 52 to be held stationary) about bolt 134, but when swung counterclockwise, will encounter the bight in plate 130 and be prevented from swinging further except by also rotating plate 130, and with it rock shaft 52. A reciprocating motor 134, in the present instance a hydraulic cylinder, has a piston rod 136 connected through a clevis 138 and pin 140 with plate 132 at a point spaced from bolt 134. Motor 134 is anchored through a pin 142 traversing an ear 144 on the motor and an ear 146 fixed on a cross member 148 fixed between channel members 6 and 8. As will be apparent, extension of motor 134 will cause counterclockwise rocking of rock shaft 52 in FIG. 1 with consequent raising of reel R while retraction of motor 134 will cause opposite movement and lowering of the reel.

With reel R resting on the ground, the movement will reach a point where rock shaft 52 will stop moving, whereupon plate 132 will swing about bolt 134 away from the bight or stop portion in plate 130, so that the load on pins 140 and 144 is relieved, and they and motor 134 may be readily removed for use on some other machine.

Returning to adjusting device 70, as particularly seen in FIG. 7, a clevis 150 is engaged with above-mentioned pin or pivotal connection 68, and has a bushing 152 through which extends a bolt 154 also extending through the ends of strap portions 156 and 158 extending lengthwise of the device. Straps 156 and 158 are welded or otherwise fixed to a collar 160 slidable on a tubular housing or guide portion 162, within which above-mentioned crank 72 is rotatable. Crank 72 has a threaded portion 164 engaged in a nut portion 166 fixed on or forming part of guide portion 162 and having guide wings or the like 168 engaging straps 156 and 158 in a manner to prevent turning of nut portion 166. The weight of reel R and its attached parts tends to continuously urge arm 66 in a clockwise direction as seen in FIG. 7, so as to maintain the parts in tension under normal working conditions. Thus collar 160 is impelled toward the left and maintained in contact with nut 166. It will now be apparent that turning of crank 72 will cause right or left movement of nut 166 relatively to crank 72, thus producing similar movement in collar 160, straps 156 and 168, and consequent rocking of rock shaft 52. Thus the height of rake reel R can be adjusted above the ground.

When motor 134 is actuated to lift the reel into the transport position, arm 66 will swing a substantial amount in a counterclockwise direction, for example, into the dotted position of FIG. 7, and will cause rightward translation of straps 156 and 158 together with collar 160. Under these conditions, the straps slide on the outside of nut 166 and tubular extension 162 acts as a guide to maintain the alignment of the parts and to prevent damage to the threads 164. This is the normal and intended operation of the parts, motor 134 acting to raise and lower the reel, while adjusting device 70 determines the lowered or working position of the reel, which latter may be readily adjusted by means of crank 72.

Figure 2:
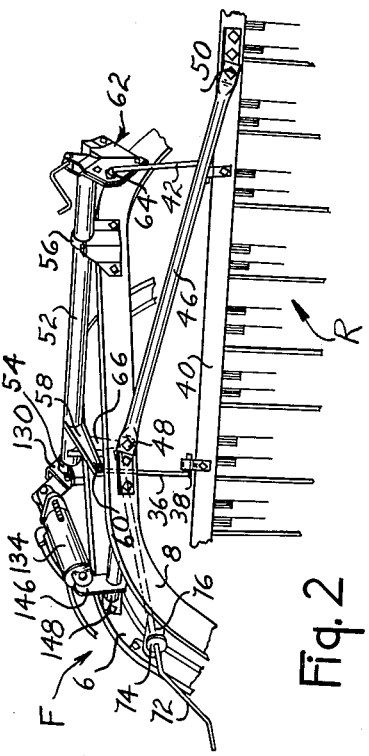
FIG. 2 is a perspective view of a portion of the same taken from above and to the left, looking toward the rear.

Turning again to arm structure 62, FIGS. 2 and 3, the device provides for up-and-down adjustment of one end of reel R independently of the other. Rock shaft 52 has fixed thereon a downwardly and forwardly inclined plate 170 which has pivoted thereto on a bolt or pivotal connection 172, a plate 174, which is conveniently made in the shape of a triangle, and which carries at its apex, above-mentioned pivotal connection 64. Plate 174 is preferably bifurcated upwardly of pivotal connection 64 and provides another pivotal connection 176 at which a trunnion block 178 is journaled and through which is threaded a crank 180. Crank 180 extends backwardly to a suitable thrust bearing 182 connecting the crank with a clevis 184, preferably pivoted to above-mentioned plate 170 on a pin, bolt, or the like 186. The parts are normally fixed in relation to each other and thus arm structure 62 serves as a simple crank or lifting arm extending from rock shaft 62 to pivotal connection 64. However, turning of crank 180 will change the center distance between pivotal connection 176 and bolt 186, and thereby cause rocking of plate 174 about pivotal connection 172. This, as apparent from the full line position of the parts, will cause raising or lowering of pivotal connection 64 and therefore link 42 and the left end of reel R. This adjustment might be represented as the dimension "X," which indicates the change in height of pivotal connection 64 resulting from a predetermined amount of turning of crank 180.

When the reel is raised by motor 134, the parts take the dot-and-dash position in FIG. 3 which brings pivotal connection 64 generally above pivotal connection 172. Under these conditions, it will be apparent that said predetermined amount of adjustment of crank 180, while producing an equal amount of rotation of plate 174, will cause very little up-and-down movement of pivotal connection 64, actually, on the order of dimension Y. Thus adjustment of crank 180 in the "down" position will have a maximum effect on link 42, while such adjustment in the "up" position will have a minimum effect thereon. As a practical matter, the result of this arrangement is that the reel will come to virtually the same position when raised, regardless of the position to which it is adjusted when lowered. Thus, if one of the wheels W and W' must run in a furrow or ditch, it is possible to adjust reel R to run level or parallel to the ground. However, when that is done, the reel will, nevertheless, come to a virtually level position whenever it is raised by motor 134.

While the rake is intended to be used with a motor such as 134, the range of adjustment possible in previously described mechanism 70 is sufficient, if crank 72 is adjusted to the extreme limit of its movement, to raise reel R into the same transport position achieved by motor 134, so that the implement is entirely usable even without the power lifting expedient. Thus, while mechanism 70 is most convenient for predetermining a lowered position to which the parts can be returned repeatedly, if motor 134 is disabled, or not present, mechanism 70 can be used without the power lifting arrangement as both a lifting and as an adjusting mechanism.

The operation of the device is thought to be clear from the foregoing, it being noted that the rake reel suspended beneath the usual arched frame is driven so as to rake the crop toward one side of the path of movement. The raking reel is suspended from two rigid links connected to a rock shaft, so as to be virtually prevented from oscillating in a vertical plane, such oscillations being undesirable because of the resulting violent contact of the raking teeth with the ground. The reel is readily raised and lowered by means of the hydraulic motor 134 and returns to a raking position determined by the adjusting or screw mechanism 70. In the absence of motor 134, mechanism 70 can be used for both the adjusting and lifting functions.

One of the ends of reel R may be adjusted for leveling purposes, but even when lowered will come to approximately the same position for transport as when level.

Cylinder 134 may be readily removed and replaced by simply collapsing it, by actuation of the usual fluid supply and controls, whereupon plate 132 may be swung about pin 134 to line up the holes for pins 140 and 142.

The backward reaction of the crop against teeth 126 is taken by control mechanism 78 which tends to exert a forward and downward force counterbalancing the reaction. An advantage is that this downward force, unlike any mechanism which tends to pull the reel, will tend to hold the rake down to its work, rather than to lift it over a large accumulation of crop material.

On the other hand, a violent rearward reaction, such as that caused by hitting an obstruction, will cause an upward hinging of mechanism 78 so that the reel will be relieved of destructive stresses and pass harmlessly over the obstruction. The mechanism also provides ready adjustment of the raking angle of the teeth by merely turning crank 114, and it prevents oscillation of the reel in a horizontal plane by reason of the construction of hinge portion 84 which results in lateral rigidity of the structure.

What is claimed and desired to be secured by Letters Patent of the United States is:

1. In an acute angle rake of the type comprising a longitudinally disposed main frame, a set of ground engaging wheels on the rear of the frame, means on the front of the frame for supporting and propelling the frame, a raking reel suspended beneath, transversely of and between the ends of the frame, and means for rotating the reel; the combination of a reel frame, a rock shaft above said reel frame, generally parallel thereto and journaled on said longitudinally disposed main frame, means for rocking said rock shaft and securing it in desired position, an arm fixed in relation to said rockshaft and extending in a generally fore-and-aft direction, a rigid link pivoted to said arm, extending downwardly and pivoted to said reel frame, a second arm fixed in relation to said rock shaft, spaced along said rock shaft from the first arm, a pivotal connection on said second arm, and a second rigid link connected to said pivotal connection, extending downwardly and connected with said reel frame.

2. In an acute angle rake of the type comprising a longitudinally disposed main frame, a set of ground engaging wheels on the rear of the frame, means on the front of the frame for supporting and propelling the frame, a raking reel suspended beneath, transversely of and between the ends of the frame, and means for rotating the reel; the combination of a reel frame, a rock shaft above said reel frame, generally parallel thereto and journaled on said main frame, means for rocking said rock shaft and securing it in desired position, an arm fixed in relation to said rockshaft and extending in a generally fore-and aft direction, a rigid link pivoted to said arm, extending downwardly and pivoted to said reel frame, a second arm fixed in relation to said rock shaft, spaced along said rock shaft from the first arm, a pivotal connection on said second arm, a second rigid link connected to said pivotal connection, extending downwardly and connected with said reel frame, and said pivotal connection on said second arm being shiftable in an up-and-down direction to alter the elevation of one end of the reel in relation to the other.

3. In an acute angle rake of the type comprising a longitudinally disposed main frame, a set of ground engaging wheels on the rear of the frame, means on the front of the frame for supporting and propelling the frame, a raking reel suspended beneath, transversely of and between the ends of the frame, and means for rotating the reel; the combination of a reel frame, a rock shaft above said reel frame, generally parallel thereto and journaled on said main frame, means for rocking said rock shaft and securing it in desired position, an arm fixed in relation to rockshaft and extending in a generally fore-and-aft direction, a rigid link pivoted to said arm and extending downwardly and pivoted to said reel frame, a second arm fixed in relation to said rock shaft, spaced along said rock shaft from the first arm, said second arm comprising a plate fixed on said rock shaft, a pivot on said plate spaced generally downwardly from said rock shaft, a second plate fulcrumed on said pivot, a pivotal connection on said second plate, a second rigid link connected to said pivotal connection, extending downwardly and connected with said reel frame, and means for adjusting said second plate about said pivot for shifting said pivotal connection in relation to said rock shaft in an up-and-down direction to alter the elevation of one end of the reel in relation to the other.

4. In an acute angle rake of the type comprising a longitudinally disposed main frame, a set of ground engaging wheels on the rear of the frame, means on the front of the frame for supporting and propelling the frame, a raking reel suspended beneath, transversely of and between the ends of the frame, and means for rotating the reel; the combination of a reel frame, a rock shaft above said reel frame, generally parallel thereto and journaled on said main frame, means for rocking said rock shaft and securing it in desired position, an arm fixed in relation to said rock shaft and extending in a generally fore-and-aft direction, a rigid link pivoted to said arm and extending downwardly and pivoted to said reel frame, a second arm fixed in relation to said rock shaft, spaced along said rock shaft from the first arm, said second arm comprising a plate element fixed on said rock shaft, a pivot on said plate element spaced generally downwardly from said rock shaft, a second plate element fulcrumed on said pivot, a pivotal connection on said second plate element, a second rigid link connected to said pivotal connection, extending downwardly and connected with said reel frame, means for adjusting said second plate element about said pivot for shifting said pivotal connection in relation to said rock shaft in an up-and-down direction to alter the elevation of one end of the reel in relation to the other, said adjusting means comprising a screw threadedly connected to one of said elements and extending to the other element, said screw being connected to the other element, a thrust bearing interposed between and connecting said screw to said other element, and means for rotating the screw.

5. In an acute angle rake of the type comprising a longitudinally disposed main frame, a set of ground engaging wheels on the rear of the frame, means on the front of the frame for supporting and propelling the frame, a raking reel suspended beneath, transversely of and between the ends of the frame, and means for rotating the reel; the combination of a reel frame, a rock shaft above said reel frame, generally parallel thereto and journaled on said main frame, means for rocking said rock shaft and securing it in desired position, said means comprising an arm fixed on said rock shaft and extending transversely thereof, a telescoping link comprising a pair of longitudinally disposed spaced straps, pivotally connected to the arm at one end, a collar to which said straps are united at their other ends, a nut slidable between said straps lengthwise thereof, a tubular guiding housing fixed on said nut and slidable through said collar, guiding means on said nut engaging said straps to prevent turning of said nut, a crank having a threaded portion within said tubular housing engaging said nut, said crank also having a thrust bearing portion engaged with said main frame, whereby rotation of said crank in one direction will exert a pull on said straps and cause rocking of said rock shaft in one direction, an arm fixed in relation to said rock shaft and extending in a generally fore-and-aft direction, a rigid link pivoted to said arm, extending downwardly and pivoted to said reel frame, a second arm fixed in relation to said rock shaft, spaced along said rock shaft from the first arm, a pivotal connection on said second arm, and a second rigid link connected to said pivotal connection, extending downwardly and connected with said reel frame.

6. In an acute angle rake of the type comprising a longitudinally disposed main frame, a set of ground engaging wheels on the rear of the frame, means on the front of the frame for supporting and propelling the frame, a raking reel suspended beneath, transversely of and between the ends of the frame, and means for rotating the reel; the combination of a reel frame, a rock shaft above said reel frame, generally parallel thereto and journaled on said main frame, means for rocking said rock shaft and securing it in desired position said means comprising a transverse arm fixed on said rock shaft, a telescoping link comprising a pair of longitudinally disposed spaced straps, pivotally connected to the arm at one end, a collar to which said straps are united at their other ends, a nut slidable between said straps lengthwise thereof, a tubular guiding housing fixed on said nut and slidable through said collar, guiding means on said nut engaging said straps to prevent turning of said nut, a crank having a threaded portion within said tubular housing engaging said nut, said crank also having a thrust bearing portion engaged with said main frame, whereby rotation of said crank in one direction will exert a pull on said straps and cause rocking of said rock shaft in one direction, power means for rocking said rock shaft in said direction, an arm fixed in relation to said rock shaft and extending in a generally fore-and-aft direction, a rigid link pivoted to said arm, extending downwardly and pivoted to said reel frame, a second arm fixed in relation to said rock shaft, spaced along said rock shaft from the first arm, a pivotal connection on said second arm, and a second rigid link connected to said pivotal connection, extending downwardly and connected with said reel frame.

7. In a side delivery rake of the type comprising a longitudinally disposed mobile frame, a set of ground engaging wheels on the rear of the frame, means on the front of the frame for supporting and propelling the frame, a raking reel suspended beneath, transversely of and between the ends of the frame, and means for rotating the reel; the combination with said frame of a reel frame, means on the frame connected with said reel frame and supporting it beneath the first mentioned frame, laterally rigid, rearwardly yieldable reel control structure generally rearwardly of said reel, connecting said reel and said frame and arranged to exert a pushing force on said reel by reason of forward motion of said frame, said control structure comprising a substantially rigid rearwardly directed strut element fixed on said reel frame, a link element extending rearwardly and upwardly from said strut and connected to said frame, a hinge connecting said strut element with said link element for relative swinging movement in a substantially vertical plane, and yieldable means connected with said strut and said link elements and constituted to resist upward and downward swinging movement of said strut and link elements about said hinge.

8. In a side delivery rake of the type comprising a longitudinally disposed mobile frame, a set of ground engaging wheels on the rear of the frame, means on the front of the frame for supporting and propelling the frame, a raking reel suspended beneath, transversely of and between the ends of the frame, and means for rotating the reel; the combination with said frame of a reel frame, means on the frame connected with said reel frame and supporting it beneath the first mentioned frame, laterally rigid, rearwardly yieldable reel control structure generally rearwardly of said reel, connecting said reel and said frame and arranged to exert a pushing force on said reel by reason of forward motion of said frame, said control structure comprising a substantially rigid rearwardly directed strut element fixed on said reel frame, a link element extending rearwardly and upwardly from said strut and connected to said frame, a hinge connecting said strut element with said link element for relative swinging movement in a substantially vertical plane, and yieldable means connected with said strut and said link elements and constituted to resist upward and downward swinging movement of said strut and link elements about hinge, said yieldable means being adjustable to swing said strut element relatively to said link to control the position of said reel frame.

9. In a side delivery rake of the type comprising a longitudinally disposed mobile frame, a set of ground engaging wheels on the rear of the frame, means on the front of the frame for supporting and propelling the frame, a raking reel suspended beneath, transversely of and between the ends of the frame, and means for rotating the reel; the combination with said frame of a reel frame, means on the frame connected with said reel frame and supporting it beneath the first mentioned frame, laterally rigid, rearwardly yieldable reel control structure generally rearwardly of said reel, connecting said reel and said frame and arranged to exert a pushing force on said reel by reason of forward motion of said frame, said control structure comprising a substantially rigid rearwardly directed strut element fixed on said reel frame, a link element extending rearwardly and upwardly from said strut and connected to said frame, a hinge connecting said strut element with said link element for relative swinging movement in a substantially vertical plane, and yieldable means connected with said strut and said link elements and constituted to resist upward and downward swinging movement of said strut and link elements about said hinge, said yieldable means comprising an upwardly directed arm fixed on one of said elements, a trunnion block fulcrumed on said arm at a point spaced from said element, a shaft portion slidable through said trunnion block, a clevis pivotally connected with the other element, said shaft portion being threaded into said clevis, a compression spring on said shaft between said trunnion block and said clevis, a collar fixed on said shaft between said clevis and said spring, engaging said spring and adjustable along said shaft, a compression spring on said shaft on the other side of said trunnion block from the first mentioned spring, a collar fixed on said shaft on the other side of the second mentioned spring from said trunnion block engaging said spring and adjustable along said shaft, and means for rotating said shaft for adjusting the spacing between said trunnion block and said clevis and consequently the angle of said strut element relatively to said link element.

10. In an acute angle rake of the type comprising a longitudinally disposed main frame, a set of ground engaging wheels on the rear of the frame, means on the front of the frame for suporting and propelling the frame, a raking reel suspended beneath, transversely of and between the ends of the frame, and means for rotating the reel; the combination of a reel frame, a rock shaft above said reel frame, generally parallel thereto and journaled on said main frame, means for rocking said rock shaft and securing it in desired position, an arm fixed in relation to said rock shaft and extending in a generally fore-and-aft direction, a rigid link pivoted to said arm and extending downwardly to and pivoted to said reel frame, a second arm fixed in relation to said rock shaft, spaced along said rock shaft from the first arm, a pivotal connection on said second arm, a second rigid link connected to said pivotal connection, extending downwardly and connected with said reel frame, and laterally rigid reel control structure generally rearwardly of said reel, connecting said reel and said main frame and arranged to exert a pushing force on said reel by reason of forward motion of said main frame.

11. In an acute angle rake of the type comprising a longitudinally disposed main frame, a set of ground engaging wheels on the rear of the frame, means on the front of the frame for supporting and propelling the frame, a raking reel suspended beneath, transversely of and between the ends of the frame, and means for rotating the reel; the combination of a reel frame, a rock shaft above said reel frame, generally parallel thereto and journaled on said main frame, means for rocking said rock shaft and securing it in desired position, an arm fixed in relation to said rock shaft and extending in a generally fore-and-aft direction, a rigid link pivoted to said arm and extending downwardly to and pivoted to said reel frame, a second arm fixed in relation to said rock shaft, spaced along said rock shaft from the first arm, a pivotal connection on said second arm, a second rigid link connected to said pivotal connection, extending downwardly and connected with said reel frame, reel control structure generally rearwardly of said reel, connecting said reel frame and said main frame and arranged to exert a pushing force on said reel by reason of forward motion of said main frame, and said control structure being yieldable to provide for backward swinging of said reel in response to excessive rearward pressure reaction thereon.

12. In an acute angle rake of the type comprising a longitudinally disposed main frame, a set of ground engaging wheels on the rear of the frame, means on the front of the frame for supporting and propelling the frame, a raking reel suspended beneath, transversely of and between the ends of the frame, and means for rotating the reel; the combination of a reel frame, a rock shaft above said reel frame, generally parallel thereto and journaled on said main frame, means for rocking said rock shaft and securing it in desired position, an arm fixed in relation to said rock shaft and extending in a generally fore-and-aft direction, a rigid link pivoted to said arm and extending downwardly to and pivoted to said reel frame, a second arm fixed in relation to said rock shaft, spaced along said rock shaft from the first arm, a pivotal connection on said second arm, a second rigid link connected to said pivotal connection, extending downwardly and connected with said reel frame, reel control structure generally rearwardly of said reel, connecting said reel and said main frame and arranged to exert a pushing force on said reel by reason of forward motion of said main frame, and said control structure being laterally rigid and yieldable rearwardly to provide for backward swinging of said reel in response to excessive rearward pressure reaction thereon.

13. In an acute angle rake of the type comprising a longitudinally disposed main frame, a set of ground engaging wheels on the rear of the frame, means on the front of the frame for supporting and propelling the frame, a raking reel suspended beneath, transversely of and between the ends of the frame, and means for rotating the reel; the combination of a reel frame, a rock shaft above said reel frame, generally parallel thereto and journaled on said main frame, means for rocking said rock shaft and securing it in desired position, an arm fixed in relation to said rock shaft and extending in a generally fore-and-aft direction, a rigid link pivoted to said arm and extending downwardly to and pivoted to said reel frame, a second arm fixed in relation to said rock shaft, spaced along said rock shaft from the first arm, a pivotal connection on said second arm, a second rigid link connected to said pivotal connection, extending downwardly and connected with said reel frame, laterally rigid, rearwardly yieldable reel control structure generally rearwardly of said reel, connecting said reel and said main frame and arranged to exert a pushing force on said reel by reason of forward motion of said main frame, said control structure comprising a substantially rigid rearwardly directed strut fixed on said reel frame, a link extending rearwardly and upwardly from said strut and connected to said frame, and yieldable means connected with said strut and said link and constituted to resist movement of said strut and link relatively to each other.

14. In an acute angle rake of the type comprising a longitudinally disposed main frame, a set of ground engaging wheels on the rear of the frame, means on the front of the frame for supporting and propelling the frame, a raking reel suspended beneath, transversely of and between the ends of the frame, and means for rotating the reel; the combination of a reel frame, a rock shaft above said reel frame, generally parallel thereto and journaled on said main frame, means for rocking said rock shaft and securing it in desired position, an arm fixed in relation to said rock shaft and extending in a generally fore-and-aft direction, a rigid link pivoted to said arm and extending downwardly to and pivoted to said reel frame, a second arm fixed in relation to said rock shaft, spaced along said rock shaft from the first arm, a pivotal connection on said second arm, a second rigid link connected to said pivotal connection, extending downwardly and connected with said reel frame, laterally rigid, rearwardly yieldable reel control structure generally rearwardly of said reel, connecting said reel and said main frame and arranged to exert a pushing force on said reel by reason of forward motion of said main frame, said control structure comprising a substantially rigid rearwardly directed strut fixed on said reel frame, a link extending rearwardly from said strut and connected to said frame, a hinge connecting said strut with said link for relative swinging movement in a substantially vertical plane, and yieldable means connected with said strut and said link and constituted to resist upward and downward swinging movement of said strut and link about said hinge.

15. In an acute angle rake of the type comprising a longitudinally disposed main frame, a set of ground engaging wheels on the rear of the frame, means on the front of the frame for supporting and propelling the frame, a raking reel suspended beneath, transversely of and between the ends of the frame, and means for rotating the reel; the combination of a reel frame, a rock shaft above said reel frame, generally parallel thereto and journaled on said main frame, means for rocking said rock shaft and securing it in desired position, an arm fixed in relation to said rock shaft and extending in a generally fore-and-aft direction, a rigid link pivoted to said arm and extending downwardly to and pivoted to said reel frame, a second arm fixed in relation to said rock shaft, spaced along said rock shaft from the first arm, a pivotal connection on said second arm, a second rigid link connected to said pivotal connection, extending downwardly and connected with said reel frame, laterally rigid, rearwardly yieldable reel control structure generally rearwardly of said reel, connecting said reel and said main frame and arranged to exert a pushing force on said reel by reason of forward motion of said main frame, said control structure comprising a substantially rigid rearwardly directed strut fixed on said reel frame, a link extending rearwardly and upwardly from said strut and connected to said frame, a hinge connecting said strut with said link for relative swinging movement in a substantially vertical plane, and yieldable means connected with said strut and said link and constituted to resist upward and downward swinging movement of said strut and link about said hinge.

References Cited in the file of this patent
UNITED STATES PATENTS

| | | |
|---|---|---|
| 2,403,401 | Rietz | July 2, 1946 |
| 2,635,410 | Hill | Apr. 21, 1953 |
| 2,635,412 | Schroeppel | Apr. 21, 1953 |
| 2,672,005 | Hamilton | Mar. 16, 1954 |
| 2,746,233 | McClellan et al. | May 22, 1956 |